UNITED STATES PATENT OFFICE.

LYMAN REED, OF BALTIMORE, MARYLAND.

IMPROVEMENT IN COMPOUNDS FOR TREATING POTATO-ROT.

Specification forming part of Letters Patent No. 21,023, dated July 27, 1858.

*To all whom it may concern:*

Be it known that I, LYMAN REED, of the city of Baltimore and State of Maryland, have discovered a new method or process of treating potatoes preparatory to planting, and make known the following clear and full description thereof.

I will first proceed to a general and particular description of the cause of the disease which my process is designed to cure or prevent.

My investigations and experiments on this subject since 1850 have brought to light a variety of facts which have produced in my own mind the conviction that I have traced to its source the true cause of the premature decay of the potato-vines, and the consequent disease known as the "potato-rot." I have found by a close, systematic, and thorough microscopic examination that the potato-vines are attacked at the lower joint of the roots by a minute insect in the larva age, and where, for many weeks, they subsist upon the vines in that obscure position, producing at the same time a poisonous infection which spreads in the sap, and is imbibed more or less by every growing tuber. In tracing the entomological genus of this insect it proves to be a species of the aphides and of the coleopterous or hemipterous family. It appears evident from my various examinations and repeated experiments for seven years past that this insect makes the potato the nidus for the propagation of its species. Early in the summer of 1851 I was attracted by a singular appearance of some vines in many hills of potatoes then growing on my place in Waltham, Massachusetts. In most of the hills I discovered the under leaves of one or more of the vines had changed color, having a yellowish-brown or dead appearance. I examined these stalks, and by the aid of a pocket-microscope I found, evidently, that some insect had been at work eating and grinding the first joint of the vine nearest to the parent tuber. After a thorough research and the labor of taking up many whole hills for examination I finally discovered the insects above alluded to. The extent of their ravages and the appearance of so minute an insect was only superficial and very imperfect without the aid of the microscope. The source from whence they came or the evidence of their origin in that position was to me a matter of perfect unaccountability at first. Shortly after this discovery in the field I made a microscopic examination of some of the same kind of potatoes as those planted, (being of the same parcel,) which I had placed in flower-pots on a shelf in my shed. The same kind of insects were at work upon the sprouts, girdling and subsisting upon the joint nearest to the mother tuber. I also went to my cellar, taking from thence the same kind of potatoes, (part and parcel of the same as planted and in my shed.) I found there the same kind of insect as before named at work and subsisting upon those which were sprouted. The potatoes still remained firm and hard as when put into the cellar, having the appearance of sound healthy tubers, suitable for the use of the table or for planting. There was revealed to me, by a microscopic examination, the very young insect, and in the three different localities, invariably in or near the same position on the tuber. There was evidence irresistible and conclusive to my mind that at some period these potatoes had been selected as the nidus and hibernating depository of insects' eggs. These discoveries and the subsequent results destroy forever the ideas and theories which have been advanced and advocated by many experienced scientific men, that fungus or atmosphere were the cause of the decay of the vines and disease of the potatoes. These theories cannot, either of them, be supported against the array of facts which I have discovered and traced out by my continued yearly and systematic experiments on this subject for a period of seven years past. The results which have been attained, and which I can produce by the application of my prescription to the seed-tuber, are conclusive in destroying both of these theories. Those advocates who have advanced and support them have no power by resorting to agricultural experiments, by investigating science, or the exercise of rhetoric to repel the philosophical principles of my theory as to the cause of the disease. I can point to them the spot where they will find the early ravages upon the vines by the larva of an insect too minute for human vision. Their attack is in a spot obscure from general view; but when the earth is removed from the hills the microscopic power reveals the secret of the destruction prematurely of the potato-vines and shows the spreading of a poisonous infusion, which in time germinates the fungus on the vines discovered by these advocates, but which only shows itself months after the insects have breathed their pestilential venom on the first vital joint of the vines as they spring from the tubers.

Dr. Wallroth, a German botanist, the late J. E. Teschemacher, and Dr. C. T. Jackson, of Boston, are among the early advocates of the fungus theory, and as the first cause of the disease. In some of their communications which have gone before the world they tell us that the disease is first indicated by numerous small drops of honey-dew on the stems of the potato-plant about the 20th of August. In the present examination of this subject these individuals and all others who advocate this theory must remember that I point out to them in April or May myriads of the aphis in the larva age, then at work with their poisonous beads, satiating their craving appetites at the fountain-pores and vital joints of that plant, and when their existence thus continued in that age is ended they creep to the young tubers to perform their perforations in them. Changed in existence, they deposit their eggs and appear in the pupa age on the stems and under side of the leaves above ground, where they harmlessly subsist and grow to the perfect insect, and by their excrement spread in their tracks the small drops of honey-dew; but never by this last act and age of existence do they destroy and poison a plant and its tubers, which in their earlier and larva age they have so effectually and thoroughly poisoned at its vitals and destroyed months before. The remote cause of the disease is shown in this early attack, and clearly originating in the natural development of the propagation of insects.

The Omniscient Being, who gave to the human family reason, wisdom, and forethought regarding their offspring, has also implanted in the smallest insect or creature he has formed the same innate power and forethought. They invariably search and plan for the early subsistence of their young; and by a hibernating process tubers the growth of 1856 contained, when planted this year, the eggs of insects or seeds of disease which has spread with so much virulence through this year's crop. Hence tubers the growth of 1847 contain, from the source I have described, the eggs or seeds of disease which will most certainly make an attack and show itself in the same form in the crop of 1858. The first direct attack of the disease is at the period, earlier or later, whenever the tuber is in a temperature to germinate. The insects then come from their nidus (or nest) in the potato, whether planted or not, and, as intimated before, subsist in their larva age upon the first joint of the sprouts or vines nearest to the tuber. Their attack is evidently poisonous, and when the vines are above ground and conveying nourishment for the formation and growth of the new tubers, then they begin first to imbibe an internal disease through the stems by a poisonous infusion from the insect's attack passing in the sap through the capillaries of the vines to the young tubers; and this early age of their growth the imperceptible action has commenced, and the soft and dry rot resulting therefrom is working into the watery cells and spreading to the heart of every tuber in proportion to the virulence and ravages of the insects at the roots. The insects often make a direct attack upon the new tuber, when very young, half the size of a pea, and by their ravenous appetite in the larva age often leave (if they do not entirely destroy) eaten places and a slimy track which forms the scabs, warts, and tumors observed on the tubers, and finally this attack, in connection with the other, hastens the rot already commenced at the stem end of the potato. The vines of the potatoes having been girdled at their roots by insects early in their growth, their vital power is destroyed partially, if not entirely, and no human application can then stimulate or perpetuate their action in nourishing and sustaining the young tubers on the vines to mature growth.

The disease will be seen by a brown rust passing from the vine into the tuber, and is clearly visible at the stem end of the potato when the vine has died prematurely. This brown-rusty appearance is the effect of the attack of the insects. By cutting open the vines from the first joint it is easy to trace up into the capillaries of the stalk the same brown rust as found in the first joint where the attack is made. From the vines it passes through the stems into the young tubers. Cut off the skin at the stem end of a potato and you will find a brown-rusty spot instead of a healthy hard stump of a stem, as is always shown in a healthy, sound, uninfected tuber. This small and almost imperceptible spot is shown by the microscope to be a rotten speck. Cut the potato through from the stem end to the eye end and with the microscopic examination, if not with the natural vision, this brown rust is traced from the stem end, penetrating in a certain radius from the outer surface, and by a dark streak working into the heart of the potato, which finally causes the rot. There are scabs and warts often found on the surface of the potatoes, also eaten places in the tubers. These appearances are the result of their contact and direct attack on the tuber and their ravages when young and before changing to pupa state. Many cases of this kind have repeatedly come under my observation, where this attack and contact produces a withered appearance and often an entire destruction of the young tubers before they have attained the size of a pea. The final effects of the early attack of the insects is not discernible by a general view of the crop until late in the season. Then (the girdling of the insects having destroyed the vital power of the vines) they feel the effects of the alternate changes of rain and sunshine. The sudden action of heat and cold soon produce a simultaneous premature destruction of the vines, and they consequently leave at their roots a light crop of half-grown, watery, diseased, and rotten tubers. This is the result of the attack and the progress of the disease, all substantiated by facts that cannot be repelled. The disease and destruction of the potato crop in this country, in Europe, and other parts of the world needs no further proof. It results from this army of insects in their larva age.

The aphides, or this insect which so nearly resembles that order or genus of insects, is found in its final development of existence to have four ages, viz: First—eggs, white, oval shape, very minute, and not perceptible to the natural human vision, but require the aid of a microscope; second—larva, whitish, semitransparent, not visible to the natural human vision when very young, but discernible with the microscope, antennæ and legs very short, two antennæ, six legs; third—pupa, whitish-brownish greenish-grayish bodies, antennæ and legs longer than in the larva age, varying in color and appearance in this age, conforming to age and position; fourth—perfect insect, cased-winged beetle, jet-black.

To show a more perfect illustration of the insects than I can do by any written description, I have taken the pains to collect the insects in the three latest ages, and they are contained in three vials, as described below: Vial No. 1 contains the insects in the larva age; vial No. 2 contains the insects in the pupa age; vial No. 3 contains the insects in the perfect age.

I consider the communication which I have made thus far of my discoveries, examinations, and experiments, showing so many facts, sufficient to illustrate and convince the most skeptical as to the cause of the disease. I will, however, add a few words, with other illustrations.

In my communication to the governor and council of Massachusetts, in answer to a resolution of the State legislature, (sealed under restrictions,) I stated that I believed the eggs of the insects when found would be discovered near and about the germinating part and under the eyebrow of the potato, where the young when hatched would find subsistence. It was not till early in 1856, after five years of close and diligent research, that I first found the eggs of the insects, and they were found first in the position in which I had previously described to the State Department.

The following illustration and statistics reveal my early prediction and show philosophically the power of research and the habits carried out by the instinct—we may almost say reason—of insects. In August last I selected at the market a potato raised about three miles from this city, measuring five inches in circumference, and with a pencil marked the tuber, as near as possible, into five different sections, counting the perforations for the deposit of the insect's eggs in each section. This is the result:

1st section.—Stem end of the tuber................ 71 punctures.
2d section.—Next to the stem end of the tuber.... 85 punctures.
3d section.—Center of the tuber.................. 101 punctures.
4th section.—Next to the eye end of the tuber.... 130 punctures.
5th section.—Eye end of the tuber................ 149 punctures.

Total......................................... 536 punctures.

This result shows facts illustrative of my early prediction, and that the eye end, as a general rule, (which is corroborated to me in all my examinations,) contains a double portion of the insect's eggs. This also shows and establishes the principles and facts revealed by entomology.

From these discoveries and facts—the results of my researches in 1851—all so clear and conclusive to my mind as not to admit even a doubt as to fact that the eggs had been hibernated in the tuber, I turned my researches for some sure method to destroy the insects or their eggs before the seed-tuber is planted, and without destroying the germinating properties of the potato. I was led to the natural and reasonable conclusion, from the fact of discovering the insects on the surface in three different localities, that powerful solar or moderate artificial heat, or both, applied a given time to the tuber would hatch these eggs and bring all the insects upon the outer surface of the tuber, the same as found in the various and different portions of my examinations, and before they were planted. This object attained, the insects roving upon the surface of the tuber or subsisting upon their sprouts, could easily be destroyed by immersing the tuber in a compound liquid poisonous to the insects and not destructive to the tuber, and thus by the early destruction of the insects the seed-tuber would go into the ground apparently free from the direct cause of the premature decay of the vines and the remote cause producing the disease to the emanating tuber. This course I have adopted and carried out for years past in repeated consecutive cultivation, and my experiments show that those seed-tubers to which my prescription has been applied have produced healthy, vigorous, stalks, which have continued to grow generally till killed by the frost, and a long period beyond those to which my prescription had not been applied, although growing side by side.

The consequences and results which have been derived from my preparation of the tuber have been a long-continued growth of the vines, a large increase in the size of the tubers, an increased quantity of the crop of from fifty to one hundred per cent., while the potatoes are apparently all sound and free from rot.

In order to furnish a more perfect illustration than I can give in writing of the perforations and appearance of the tuber containing the eggs of the insects, I selected in the market a potato recently dug, and marked the same into five sections, as equally as possible. In counting the perforations containing the eggs I find the following to be the result:

| Section | Punctures |
|---|---|
| 1st section.—Stem end of the tuber, about | 110 punctures. |
| 2d section.—Next to the stem end of the tuber, about | 127 punctures. |
| 3d section.—Center of the tuber, about | 130 punctures. |
| 4th section.—Next to the eye end of the tuber, about | 152 punctures. |
| 5th section.—Eye end of the tuber, about | 186 punctures. |
| Total | 705 punctures. |

I have seen tubers in which I have counted one thousand punctures.

Having fully described the cause, appearance, and nature of the potato disease, and furnished the expositions and facts in support of and as evidence of my theory, I will now proceed to describe the method of prevention and cure.

*Prescription for the prevention and cure of the potato-rot or potato disease.*

First. Potatoes selected for seed, to be acted upon by the prescription, should be above the medium and as near as possible of uniform size, in order to secure equal action on all tubers. I earnestly recommend in all cases to plant whole seed, to give more vigor to the vines. If cut, let them be not smaller than halves.

Second. The seed-potatoes must, in preparation for planting, be spread thin on shelves or stage-platforms elevated, as may be convenient, two, four, and six feet above the floor in, a tight outbuilding or room, using either solar or artificial heat by stoves or otherwise, or both united, to raise the temperature of the room to between 80° and 100°, not confining myself to these exact temperate temperatures, for less than 80° may hatch the eggs and more than 100° will not destroy the germinating property of the tuber, the potatoes to remain in this position and temperature, as near as possible, about three weeks. Occasionally, daily if convenient, the potatoes should be stirred about, thus giving them all as uniform exposure as possible to the warm temperature. This hastens the germinating properties of the tuber and at the same time brings the vital and generative properties of the insects in their eggs into existence and in motion upon the outer surface of the tuber. These insects, being the seed of disease on the potato, to be transmitted to the next generation of tubers, are by this process brought into existence while the potato is under your control, out of the ground. Kill these insects and you prevent and cure the disease.

Third. To kill these insects and destroy their eggs soak the seed-potatoes, after the foregoing-described action of heat upon them, from eighteen to twenty-four hours in the following composition or compound. Take potash and fish-oil and other suitable ingredients to make and constitute hard oil-soap. Dissolve thoroughly, or in proportionate quantities, one gallon of this hard oil-soap in thirty-two gallons of water. This liquid, or any other material, compound, or composition, of whatsoever name or nature, possessing similar qualities of alkalies, stringents, oils, or other chemical properties posionous to the insects, however applied, hot or cold, and harmless to the germinating virtue of the tuber, may be used to destroy the insects.

Fourth. After taking the potatoes from the barrels or hogsheads of liquid, have the seed-tubers dried by solar or artificial heat two or three days, or longer if convenience require it. They are then prepared for the ground. Plant in your usual method.

The undersigned declares that the description made in the foregoing, showing the cause of the potato disease, or known as the "potato-rot," and the application of a prescription, as described, to act on the tuber to prevent and cure said disease or potato-rot, has been the result of his own investigations, examinations, experiments, researches, and discoveries.

I do not broadly claim the application of heat or oils or poisonous substances to destroy insect life, as this has been done before for other purposes; but What I do claim, and wish to secure by Letters Patent, is—

The treatment of the potato preparatory to planting to the process above set forth—viz., first subjecting it to solar or artificial heat, and then to the action of the liquid above described or any other analogous or equivalent thereto.

Baltimore, October 22, 1857.

LYMAN REED.

Witnesses:
WM. GUNNISON,
H. W. PERROW.